(12) United States Patent
Taylor et al.

(10) Patent No.: US 11,269,676 B2
(45) Date of Patent: Mar. 8, 2022

(54) MANAGED VIRTUAL APPLIANCES

(71) Applicant: VMware, Inc., Palo Alto, CA (US)

(72) Inventors: Steven Taylor, San Carlos, CA (US); Rahul Agarwal, Sunnyvale, CA (US); Etienne Robert Le Sueur, New York, NY (US); Sindhu Shashidhara, Sunnyvale, CA (US); Sunny Tulsi Sreedhar Murthy, Mountain View, CA (US); Gal Yardeni, Mountain View, CA (US); Sandhya Pai, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 174 days.

(21) Appl. No.: 16/516,945

(22) Filed: Jul. 19, 2019

(65) Prior Publication Data

US 2021/0019163 A1    Jan. 21, 2021

(51) Int. Cl.
| | |
|---|---|
| *G06F 9/455* | (2018.01) |
| *G06F 9/50* | (2006.01) |
| *G06F 9/4401* | (2018.01) |
| *G06F 8/61* | (2018.01) |

(52) U.S. Cl.
CPC ............ *G06F 9/45558* (2013.01); *G06F 8/63* (2013.01); *G06F 9/4406* (2013.01); *G06F 9/5077* (2013.01); *G06F 2009/45562* (2013.01); *G06F 2009/45575* (2013.01)

(58) Field of Classification Search
CPC .. G06F 9/45558; G06F 9/5077; G06F 9/4406; G06F 8/63; G06F 2009/45575; G06F 2009/45562
See application file for complete search history.

(56) References Cited

U.S. PATENT DOCUMENTS

| | | | |
|---|---|---|---|
| 2006/0218544 A1* | 9/2006 | Chakraborty | G06F 8/63 717/168 |
| 2011/0265077 A1* | 10/2011 | Collison | G06F 8/60 717/172 |
| 2012/0030672 A1* | 2/2012 | Zygmuntowicz | G06F 8/60 718/1 |
| 2015/0142878 A1* | 5/2015 | Hebert | G06F 9/4843 709/203 |
| 2021/0006636 A1* | 1/2021 | Koehler | H04L 67/2823 |

* cited by examiner

*Primary Examiner* — Dong U Kim
(74) *Attorney, Agent, or Firm* — Thomas Horstemeyer, LLP

(57) ABSTRACT

Disclosed are various embodiments for creating and managing virtual appliances. A command to create a virtual machine image for a hosted instance of an application image is received. The virtual machine image is created in response to receiving the command. The virtual machine image can include an operating system; a container orchestration service configured to host the instance of the application image; and a configuration service. The configuration service can be configured to at least install a management agent in response to a first boot of the virtual machine and configure the management agent to download and install the application image.

20 Claims, 6 Drawing Sheets

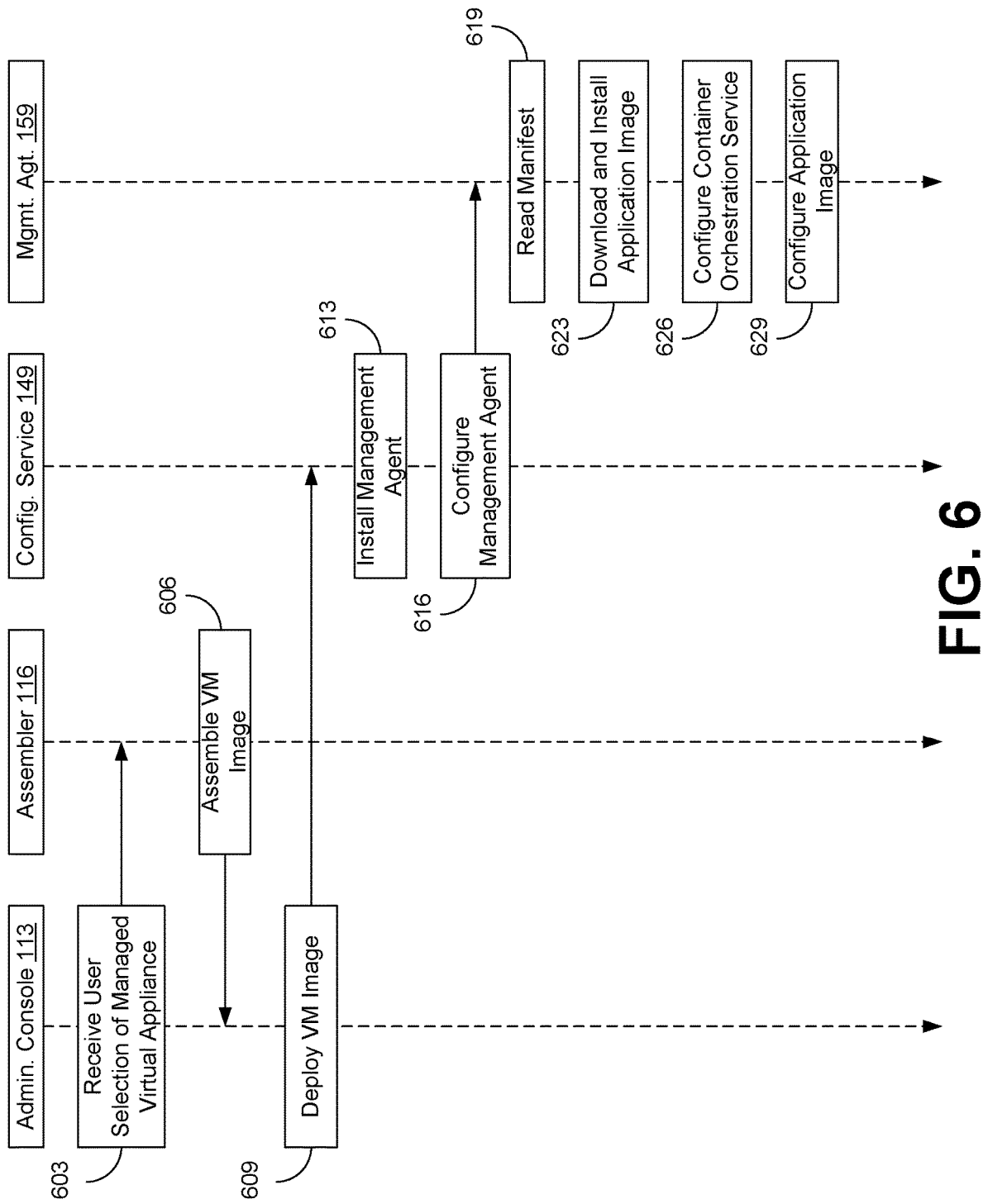

MANAGED VIRTUAL APPLIANCES

BACKGROUND

Software providers often are forced to maintain multiple, separate code bases for the same application. This may be necessary because the software provider allows for the application to be installed in different environments. For example, one version of a server or service application may be developed for deployment in hosted computing environment, commonly referred to as a "cloud computing environment," while another may be developed for deployment in a customer's own data center. Although the application may provide the same functionality in either deployment scenario, separate code bases may be required to support installation and execution in each environment due to the differences between a hosted computing environment and a customer's own computing environment.

The development effort associated with maintaining multiple code bases grow considerably with the number of platforms supported. For example, any change to the functionality in an application must be tested with each code base. Similarly, changes made to solve a problem in one code base will need to be tested to ensure that they do not impact the functionality of other code bases maintained for the application.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 6 is a sequence diagram illustrating the interactions between the various applications executed in the network environment of FIG. 1.

DETAILED DESCRIPTION

Disclosed are various approaches for creating virtual appliances to support multiple deployment environments using a single code-base for an application. Software providers often are forced to maintain multiple, separate code bases for the same application to support different deployment environments. For example, one version of a server or service application may be developed for deployment in hosted computing environment, commonly referred to as a "cloud computing environment," while another may be developed for deployment in a customer's own data center. To solve this problem, a virtual appliance that replicates the hosted computing environment can be deployed in a customer data center. Because the virtual appliance replicates the hosted computer environment, a single version of the application can be maintained.

However, providing virtual appliances introduces another set of problems. Namely, the individual components of the virtual appliance need to be regularly updated. Otherwise, a customer is at risk of downloading and installing a virtual appliance with outdated components (e.g., an out of date version of the application or operating system). When a software provider or developer has many different applications available for customers, the maintenance burden of continuously creating new virtual appliances or maintaining existing virtual appliances increases considerably.

To solve these problems, various implementations of the present disclosure allow for a virtual appliance to be created on demand in order to incorporate the most recent versions of the components included in the virtual appliance. The virtual appliance can include services that would be utilized in a hosted or cloud computing environment, thereby emulating the hosted or cloud computing deployment scenario. As a result, a code-base for an application that is normally deployed in a hosted or cloud computing environment can be supported in scenarios where a customer or user would wish to host the application on their own premises (e.g., on their own servers or data center). Accordingly, a single code-base can be used to support multiple deployment scenarios for an application instead of maintaining multiple versions of the code-base to support multiple deployment scenarios. In the following discussion, a general description of the system and its components is provided, followed by a discussion of the operation of the same.

Figure 1:
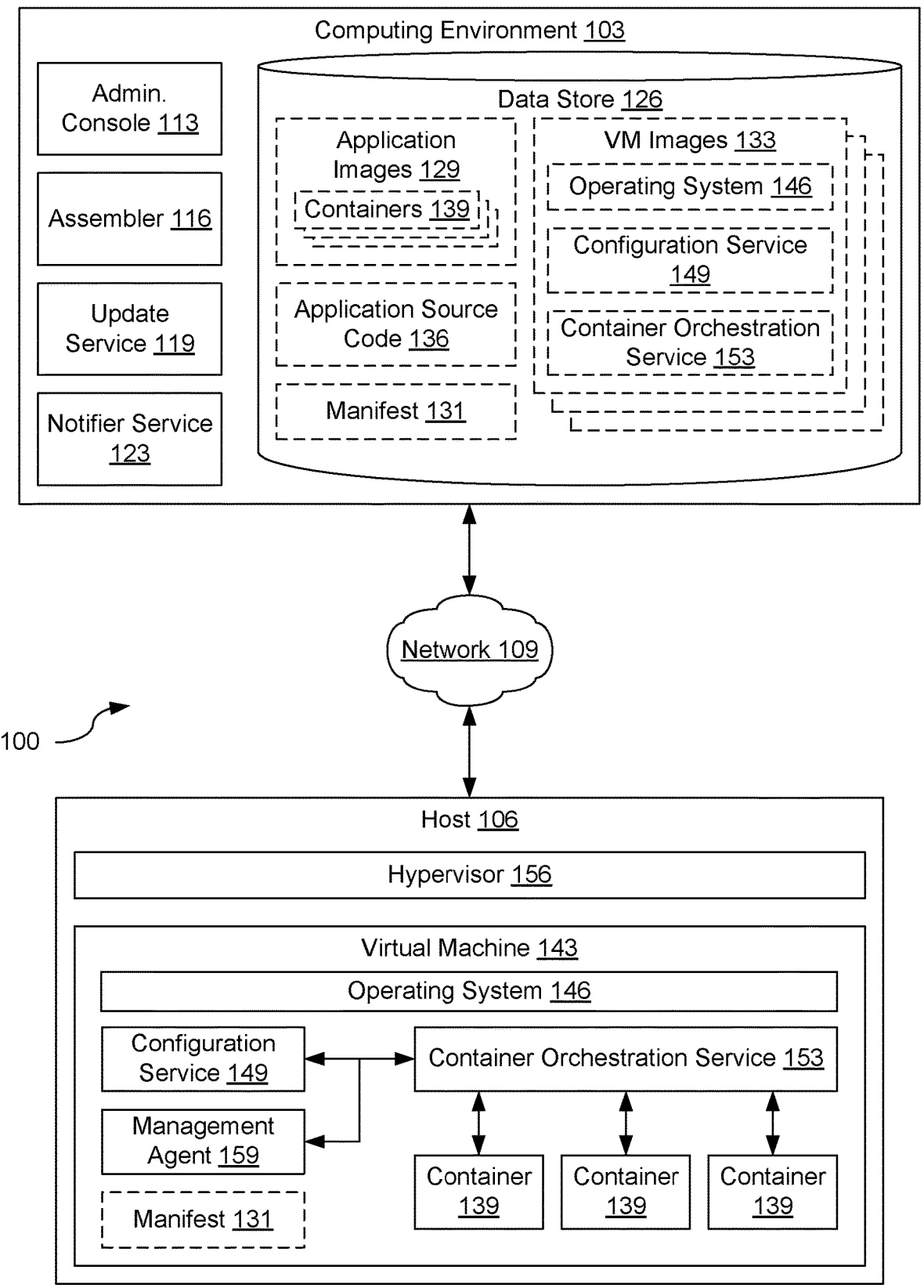
FIG. 1 is a drawing of a network environment according to various embodiments of the present disclosure.

FIG. 1 depicts a network environment 100 according to various embodiments. The network environment 100 includes a computing environment 103 and one or more hosts 106, which are in data communication with each other via a network 109. The network 109 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include a server computer or any other system providing computing capability. Alternatively, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various embodiments. The components executed on the computing environment 103 include an administrative console 113, an assembler 116, and update service 119, and a notifier service 123, among various applications.

Also, various data is stored in a data store 126 that is accessible to the computing environment 103. The data store 126 can be representative of a plurality of data stores 126, which can include relational databases, object-oriented databases, hierarchical databases, hash tables or similar key-value data stores, as well as other data storage applications or data structures. The data stored in the data store 126 is associated with the operation of the various applications or functional entities described below. This data can include one or more application images 129, a manifest 131, one or more virtual machine images 133, application source code 136, and potentially other data.

The application images 129 can represent binary executable versions of an application that are compiled or otherwise generated from the application source code 136. An application image 129 can include a standalone binary or a collection of independent applications and other components that, when executed, provide the functionality of a larger application. Accordingly, each application image 129 can include one or more containers 139, which provide for operating-system-level virtualization environments that can be used to host separate applications or services (e.g., mail servers, web servers, database servers, application servers). Each container 139 can include its own bundle of software, libraries, and user-space utilities to allow for a self-contained execution environment hosted by shared operating system kernel. Illustrative examples of containers 139 include DOCKER® containers, FREEBSD® jails, chroot jails, and SOLARIS® zones.

The manifest 131 can represent a configuration file that can be used to configure the operation of an application or applications that are installed on the virtual machine 143, as described in further detail later. Examples of data that can be included in a manifest include host names, user names and passwords, network configuration settings, values for configuration settings for specific application components, and similar configuration information.

The virtual machine images 133 can represent disk images (e.g., hard disk images) that contain the components of a virtual machine 143. These components can include an operating system 146 for the virtual machine 143, a configuration service 149, a container orchestration service 153, and a manifest 131 for configuration of an application installed on or hosted by the virtual machine 143. A virtual machine image 133 can be packaged as an Open Virtualization Archive (*.ova) file, which is a single file version of an Open Virtualization Format (*.ovf) image. However, other file formats can also be used in various implementations, such as the Virtual Machine Disk (*.vmdk) file format.

The application source code 136 can be human readable computer code that, when provided as an input to a compiler or interpreter, is translated into computer-readable machine code, such as an executable binary file. For example, the application source code 136 can be compiled to create application images 129 for a hosted or distributed application, including the containers 139 that provide functionality or components for the larger application as a whole.

The administrative console 113 can configure or control the operation of the various components of the network environment 100. For example, the administrative console 113 can provide a web-based user interface to allow a user to select and retrieve a virtual machine image 133 configured to host an application image 129 for a respective application. As another example, the administrative console 113 can provide a web-based user interface to allow an administrative user to approve or block distribution of updated application images 129 to virtual machines 143 managed by the administrative user.

The assembler 116 can be executed to create a virtual machine image 133. This can include creating a virtual disk of sufficient size to hold all of the components to be added to or installed into the virtual machine image 133. In addition, the assembler 116 can select and install the current or most recent version of the operating system 146 to be used, as well as a current version of the configuration service 149, and a manifest 131 appropriate for a virtual machine 143 hosting a respective application image 129 for an application.

The update service 119 can determine when a new application image 129 for an application has been created and make the new application image 129 available to any virtual machines 143 hosting the respective. For example, the update service 119 can periodically poll the application images 129 to determine when a new version has been created. As another example, the update service 119 can periodically poll the application source code 136 to determine if a new version has been saved to the data store 126.

The notifier service 123 can notify a virtual machine 143 that an update is available from the update service 119. In some instances, the notifier service 123 can also be configured to send notifications (e.g., emails, text messages, etc.) to user devices to notify them of an update.

The host 106 is representative of a computing device that can be coupled to the network 109. A host 106 could include a server (e.g., a server located on a customer premises), a workstation (e.g., a developer workstation), or other computing device. The host can be configured to execute a hypervisor 156, as well as other applications. One or more virtual machines 143 can be executed by the hypervisor of the host 106.

The hypervisor 156 is an application that can manage the hardware resources of the host 106 and share the hardware resources of the host 106 among one or more virtual machines 143. As a result, the hypervisor 156 can allow for multiple virtual machines 143 to be executed or hosted by the same computing device, while remaining isolated from each other. Many hypervisors 156 can use virtualization-specific features provided by a processor of the host 106 in order to efficiently share and manage the hardware resources of the host 106 among the hosted virtual machines 143. Examples of hypervisors 156 include the VMware ESX™ hypervisor, the VMware ESXi™ hypervisor, the VMWARE WORKSTATION™ hypervisor, the MICROSOFT HYPER-V® hypervisor, the XEN hypervisor, and ORACLE VIRTUALBOX® hypervisor.

The virtual machine 143 can represent a software emulation of a computer system. Accordingly, a virtual machine 143 can provide the functionality of a physical computer sufficient to allow for installation and execution of an entire operating system 146 and any applications that are supported or executable by the operating system 146, such as the configuration service 149, the container orchestration service 153, and the management agent 159. Accordingly, a virtual machine 143 can be used as a substitute for a physical machine. A virtual machine 143 can be based on or configured from a virtual machine image 133, as discussed later.

The configuration service 149 is a utility or collection of utilities that allows for the automated configuration of virtual machines 143. For instance, the configuration service 149 can configure usernames and passwords for a virtual machine 143, cause specific packages or applications to be installed (e.g., the management agent 159), and configure any installed applications or software. An example of a configuration service 149 is the cloud-init service provided by Canonical LTD, the distributor of UBUNTU® Linux.

The container orchestration service 153 is an application that coordinates the deployment, instantiation, and execution of individual containers 139. An example of a container orchestration service is KUBERNETES®. Although a container orchestration service 153 is typically provided in a hosted or "cloud" computing environment, including the container orchestration service 153 in the virtual machine 143 allows for a virtual machine 143 located on a customer server to host the same application image 129 generated from the same application source code 136 as an application image 129 that would be used for a deployment in a hosted or "cloud" computing environment.

The management agent 159 is an application that can download and install an application image 129, configure the application image 129 according to values specified in the manifest 131, and make any configuration changes to the container orchestration service 153 necessary for execution of the application image 129 by the container orchestration service 153.

Next, a general description of the operation of the various components of the network environment 100 is provided. Although the following description describes an example of the operation of the network environment 100, specific details are provided in the discussion of the following figures. Moreover, the components of the network environment 100 can be operated in ways other than what is describe in the following general description.

To begin, an administrative user may wish to deploy a virtual appliance within his or her organization. The deployment of a virtual appliance may be referred to as "on-premises" deployment versus "off-site" or "cloud-based" deployment of the virtual appliance. The virtual appliance is a preconfigured virtual machine image 133 that is ready to run on a hypervisor and execute or host a preconfigured application or set of applications, such as an application image 129.

The virtual appliance can be selected through a user interface provided by the administrative console 113. The virtual appliance can be presented as an option that can be selected, rented, or purchased through an application store. As another example, the virtual appliance can be presented as an option that can be retrieved from a library or archive of virtual appliances that the organization is already licensed to use. As part of the selection process, the administrative user can specify some organization specific configuration options for the virtual appliance.

When the administrative user selects a virtual appliance for on-premises deployment, the administrative console 113 can send a message to the assembler 116 to create an appropriate virtual machine image 133 for the requested virtual appliance. The assembler 116 can then create a virtual machine image 133 for the requested virtual appliance. For example, the assembler 116 can create a disk image that includes the latest version of an appropriate operating system 146, a copy of the latest version of the configuration service 149, and a copy of the latest version of the container orchestration service 153. The assembler 116 can then insert an appropriate manifest 131 for the application image 129 that will be hosted using the virtual machine image 133. In other implementations, the assembler 116 can instead select a previously created virtual machine image 133 and insert the appropriate manifest 131 into the virtual machine image 133.

Once the assembler 116 creates the virtual appliance, including the virtual machine image 133 and the manifest 131, the administrative console 113 provides a link (e.g., a uniform resource locator (URL)) in the user interface. This link can be used to download the virtual appliance for installation on the host 106. The hypervisor 156 can then initiate execution of the virtual machine 143 defined by the virtual machine image 133 of the virtual appliance.

On first boot of the virtual machine 143, the configuration service 149 can configure the virtual machine 143. For example, the configuration service 149 can cause the management agent 159 to be downloaded and installed onto the virtual machine 143. The configuration service 149 can configure the management agent 159 (e.g., specifying the location of the manifest 131), configure the container orchestration service 153, and configure the operating system 146.

After installation, the management agent 159 reads the manifest 131 to determine which actions need to be performed. For instance, the management agent 159 could download an application image 129 specified in the manifest 131 for hosting by the container orchestration service 153. The management agent 159 could then configure the application image 129 according to settings specified in the manifest 131.

After installation, the management agent 159 can periodically query the update service 119 to determine whether any updates for the application image 129 are available. Similarly, the management agent 159 can listen for notifications from the notifier service 123 indicating that updates are available for the application image 129 installed on the virtual machine 143. If updates are available, the management agent 159 can retrieve and install the updates.

Figure 2:
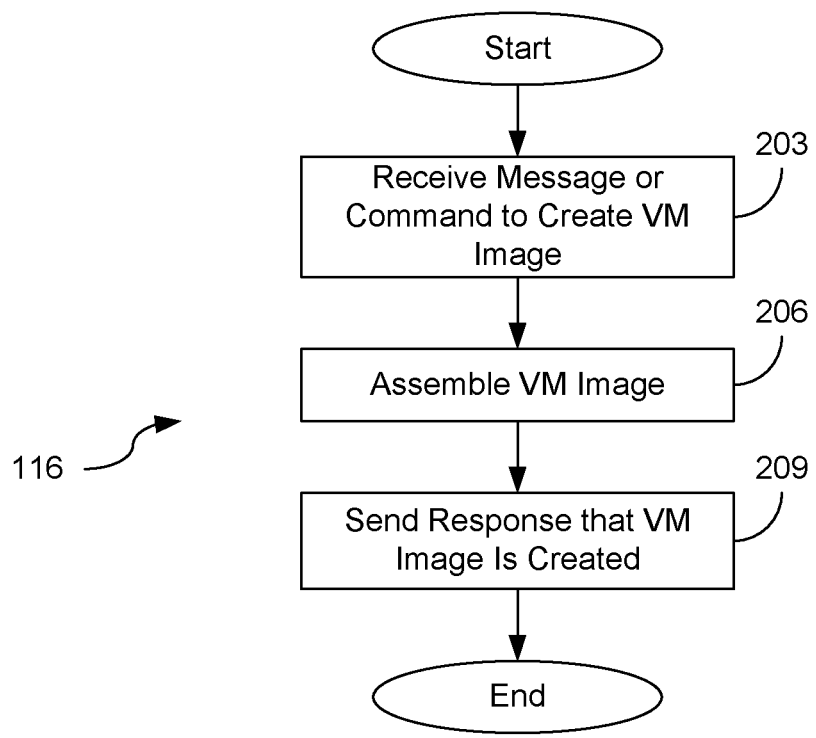
FIG. 2 is a flowchart illustrating one example of functionality implemented as portions of an application executed in the network environment of FIG. 1.

Referring next to FIG. 2, shown is a flowchart that provides one example of the operation of the assembler 116 to create a virtual machine image 133 for use as a managed virtual appliance. As an alternative, the flowchart of FIG. 2 can be viewed as depicting an example of elements of a method implemented in the network environment 100.

Beginning at step 203, the assembler 116 can receive a message or command to create a virtual machine image 133. The assembler 116 can receive the command from the administrative console 113 in response to a selection by an administrative user of a particular virtual appliance. In some implementations, the assembler 116 can create virtual machine images 133 in response to events (e.g., a new version of an operating system 146, configuration service 149, or container orchestration service 153 becomes available), in which case the assembler 116 can receive the message or command in response to the event.

Then at step 206, the assembler 116 can assemble or create the virtual machine image 133. For example, the assembler 116 can create a virtual machine disk of sufficient size to store the operating system 146, the configuration service 149, and container orchestration service 153, as well as one or more application images 129. The assembler 116 can then install the operating system 146, the configuration service 149, and container orchestration service 153.

In some instances, the assembler 116 can also add a manifest 131 for configuration of an application image 129.

For example, if the command or message received from the administrative console 113 at step 203 specifies the application image 129 that will be eventually installed on the virtual machine image 133, the assembler 116 can install a manifest 131 in the virtual machine image 133.

Finally, at step 209, the assembler 116 can send a response indicating that the virtual machine image 133 is created. For instance, if the request to create the virtual machine image 133 was received from the administrative console 113, then the assembler 116 can send a response indicating that the virtual machine image 133 has been created. The response can also include an identifier of the virtual machine image 133, allowing for the virtual machine image 133 to be downloaded or retrieved at a later time.

Figure 3:
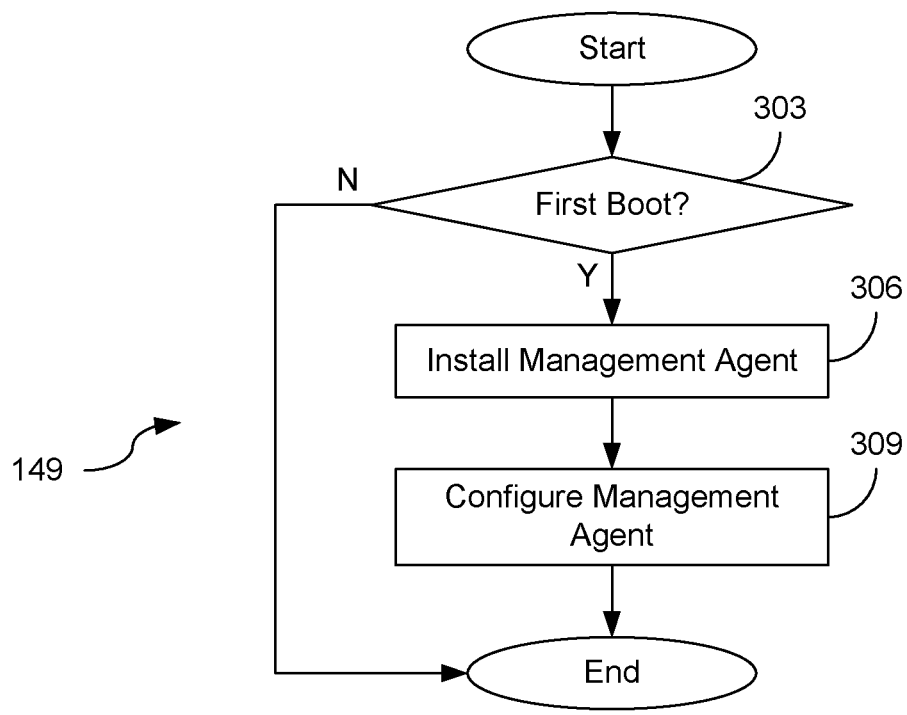
FIG. 3 is a flowchart illustrating one example of functionality implemented as portions of an application executed in the network environment of FIG. 1.

Referring next to FIG. 3, shown is a flowchart that provides one example of the operation of a portion of the configuration service 149 installed on a virtual machine 143 to configure the virtual machine 143 and install the management agent 159. The virtual machine 143 may be instantiated from the virtual machine image 133 created by the assembler 116 using the process depicted in FIG. 2. As an alternative, the flowchart of FIG. 3 can be viewed as depicting an example of elements of a method implemented in the network environment 100.

Beginning with step 303, the configuration service 149 can determine whether or not the virtual machine 143 is booting for the first time when the hypervisor 156 initiates execution of the virtual machine 143. This can be done in a number of ways. For example, the configuration service 149 can check to determine if the virtual machine 143 has been configured as specified (e.g., that particular user accounts have been created or configured, that applications have been installed, etc.). As another example, the configuration service 149 can check the value of a variable that indicates whether the virtual machine 143 has been previously booted. If the current boot process is the first boot for the virtual machine 143, then the process proceeds to step 306. Otherwise, the process ends.

Then at step 306, the configuration service 149 can cause the management agent 159 to be installed. For example, the configuration service 149 can retrieve a copy of the management agent 159 from a predefined location (e.g., a predefined URL). Once the management agent 159 is retrieved, it can then install the management agent 159.

Figure 4:
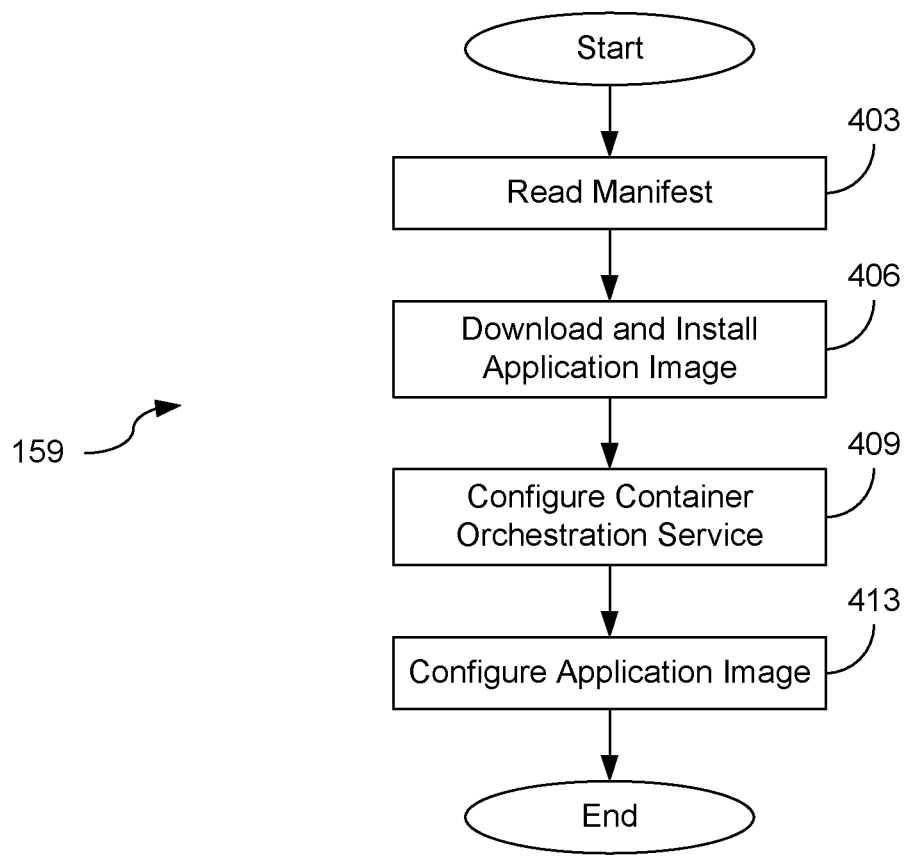
FIG. 4 is a flowchart illustrating one example of functionality implemented as portions of an application executed in the network environment of FIG. 1.

Finally, at step 309, the configuration service 149 the configuration service 149 can configure the management agent 159. For example, the configuration service 149 can specify the location of the manifest file 131 to be used by the management agent 159. After the management agent 159 is configured, Referring next to FIG. 4, shown is a flowchart that provides one example of the operation of the management agent 159 to install and configure an application image 129 on a virtual machine 143 configured by the configuration service 149, as previously depicted in FIG. 3, and instantiated from a virtual machine image 133 created by the assembler 116, as previously depicted in FIG. 2. As a result, a generic virtual machine image 133 can be automatically configured to act as a managed virtual appliance for hosting the application image 129 in the environment of the user's choice. Such environments can include user owned or user operated environments (e.g., a user's datacenter, internal network, server, etc.) or hosted environments (e.g., third-party operated data centers or similar "cloud computing" environments). As an alternative, the flowchart of FIG. 4 can be viewed as depicting an example of elements of a method implemented in the network environment 100.

Beginning at step 403, the management agent 159 can read the manifest 131 to determine which application image 129 is to be installed on the virtual machine 143. While reading the manifest 131, the management agent 159 can also determine how the application image 129 should be configured after installation.

Then at step 406, the management agent 159 can download or otherwise retrieve the application image 129 specified in the manifest from the data store 126. After the application image 129 is retrieved, the individual containers 139 in the application image 129 can be extracted and saved to the virtual machine 143. In some instances, the management agent 159 can confirm, after installation, that the installed components are the latest version and update any components if necessary.

Next at step 409, the management agent 159 can configure the container orchestration service 149 to host or manage the containers 139 unpacked or extracted from the application image 129. For example, the management agent 159 can register or otherwise notify the container orchestration service 149 of the existence of the containers 139. Then, the management agent 159 can provide the container orchestration service 149 with configuration information for each container 139 to allow the container orchestration service 149 to appropriately manage each container 139. Such information can be specified in the manifest 131 and can include information such as resource limits for a container, access permissions for a container, or similar data.

Finally at step 413, the management agent 159 can configure the installed application image 129 according to the settings specified in the manifest 131. For example, the management agent 159 can configure individual containers 139 to use authentication credentials specified in the manifest (e.g., usernames and passwords, certificates, etc.). As another example, the management agent 159 can configure individual applications or services hosted by individual containers according to settings specified in the manifest 131. For example, if a container 139 were hosting a database server, the management agent 159 might configure the database server to enable to disable particular features. Similarly, if a container 139 were hosting a web server, the management agent 159 might enable or disable particular features as specified in the manifest 131, or configure particular features to operate in a manner specified in the manifest 131.

Figure 5:
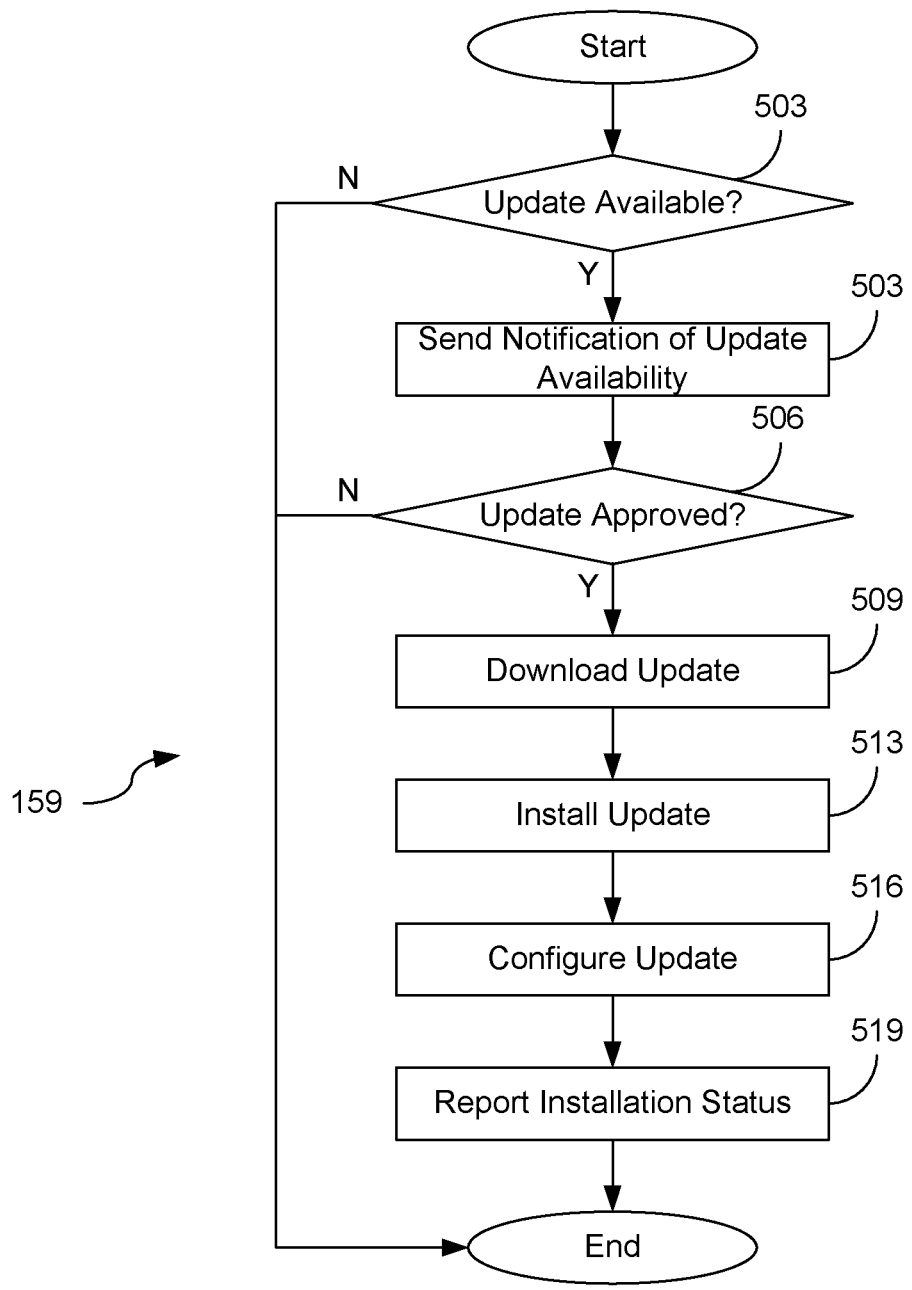
FIG. 5 is a flowchart illustrating one example of functionality implemented as portions of an application executed in the network environment of FIG. 1.

Referring next to FIG. 5, shown is a flowchart that provides one example of the operation of a portion of the management agent 159 to continue keep the application image 219 installed on the virtual machine 143 up to date. As an alternative, the flowchart of FIG. 5 can be viewed as depicting an example of elements of a method implemented in the network environment 100.

Beginning at step 501, the management agent 159 can determine whether or not an update to the application image 129 hosted by the virtual machine 143 is available. For example, the management agent 159 can receive a message or other notification from the notifier service 123 indicating that an update to the application image 129 is available. As another example, the management agent 159 can query the update service 119 directly to determine whether an update to the application image 129 or updated version of the application image 129 is available. If an update for the application image 129 is available, then the process proceeds to step 503. If no update is available, then this iteration of the process ends.

If the process proceeds to step 503, the management agent 159 can, in some implementations, send a message or notification to an administrative user that an update to the application image 129 is available. For example, the management agent 159 can send an email to a predefined address or a short message service (SMS) message to predefined phone number associated with an administrative user. This can occur separately from or in addition to any notification provided by the notifier service 123.

Then at step 506, the management agent 159 can determine whether the updated version has been approved for deployment. For example, while a new version of an application image 129 may be available, the administrative user may not have tested it for compatibility with other systems under his or her responsibility. Accordingly, the management agent 159 can send a request to the administrative console 113 to determine whether the user has approved the updated version for deployment. In another example, the management agent 159 can alternatively send a request to the update service 119 for the updated version of the application image 129. If the update service 119 responds with a copy of the updated version, then the management agent 159 can conclude that the update has been authorized. If the updated version is unavailable from the update service 119, then the management agent 159 can determine that deployment of the updated version has not yet been authorized. If an approved update is available, then the process proceeds to step 509. Otherwise, the current iteration of the process ends.

Next at step 509, the management agent 159 can download the update to the application image 129. In some implementations, this can involve downloading a complete application image 129. In other implementations, this can involve only downloading those individual parts that have been updated. This can occur when a single container 139 has been updated while other containers 139 remain unchanged.

In some instances, the management agent 159 can retrieve a new manifest 131. This can occur when the configuration settings specified in the current manifest 131 installed on the virtual machine 143 are no longer applicable to the updated version of the application image 129. For example, if a new version of the application image 129 contains additional containers 139, then a new manifest 131 may be needed to configure the services hosted by the additional containers 139. As another example, if a new version of an existing container 139 includes a service that has substantially changed, the previous settings may be deprecated and no longer supported. As a result, a new manifest 131 would be needed to reconfigure the updated version of the service hosted by the container 139. The new manifest 131 can be created using the administrative console 113 when the new version of the application image 129 is authorized for deployment.

Proceeding to step 513, the management agent 159 can install the updated version of the application image 129. For example, the management agent 159 can replace individual components (e.g., containers 139) with updated components from the new application image 129. As another example, the management agent 159 can delete the existing application image 129 from the virtual machine 143 and replace it with the new version of the application image 129. For example, the management agent 159 can delete and replace each of the existing containers 139 with new, updated containers 139.

Then at step 516, the management agent 159 can then configure the new or updated version of the application image 129. For example, the management agent 159 can read the existing manifest 131 and verify that the settings specified in the manifest 131 remain applied to the new or updated version of the application image 129. If a new manifest 131 was retrieved at step 509, then the application image 129 could be configured according to the settings specified in the new manifest 131.

Finally at step 519, the management agent 159 can report the installation status of the update. For example, the management agent 159 can report to the administrative console 113 or the update service 119 that the update was successfully applied, allowing the administrative console 113 to report the new version of the application image 129 installed on the virtual machine 143 on the host 106.

FIG. 6 is a sequence diagram depicting the interaction of the administrative console 113, assembler 116, the configuration service 149, and the management agent 159, as previously depicted in FIGS. 2-4, to create and deploy a managed virtual appliance on-demand. As an alternative, the sequence diagram of FIG. 6 can be viewed as depicting an example of elements of a method implemented in the network environment 100.

Beginning with step 603, the administrative console 113 can receive a selection from an administrative user of a managed virtual appliance to deploy. For example, the administrative user may search for an application from an application store made available through the administrative console 113. As another example, the administrative user may search through a directory provided by the administrative console 113 of previously authorized or licensed applications which the administrative user can deploy. Once the administrative user has made his or her selection, the administrative console 113 can send a message to the assembler 116 identifying the application selected in order for the assembler 116 to create the respective virtual machine image 133.

At step 606, the assembler 116 can create an appropriate virtual machine image 133. This can be done according to the process previously illustrated in FIG. 2. Once the assembler 116 has created the appropriate virtual machine image 133, it can send a message to the administrative console 113 indicating that the virtual machine image 133 is ready. The message may include a URL from which the virtual machine image 133 can be retrieved.

Next at step 609, the administrative console 113 can deploy the virtual machine image 133. For instance, the administrative user could specify a host 106 for the virtual machine image 133. In response, the administrative console 113 could send a command to the host 106 to download and instantiate a virtual machine 143 based on the virtual machine image 133. The command could include the URL from which the host 106 could retrieve the virtual machine image 133.

Once the host 106 instantiates the virtual machine 143, the configuration service 149 can further configure the virtual machine 143 when it begins execution for the first time. This can include, among other items, installing and configuring the management agent 159 at steps 613 and 616 using the process previously described in FIG. 3. After configuring the virtual machine 143 and installing and configuring the management agent 159, the configuration service 149 can then cause the management agent 159 to begin execution.

At steps 619 through 629, the management agent 159 can download, install, and configure an application image 129 to be hosted by the virtual machine 143. The actions performed in individual steps 619-629 are previously described in further detail in the discussion of the process depicted in FIG. 4.

As a result of the steps illustrated in FIG. 6, the virtual machine 143 is configured and instantiated to operate as the managed virtual appliance selected by the administrative user at step 603. Instead of relying on a previously generated virtual machine image 133, which may include outdated components, the virtual machine 143 is ensured to utilize the most up-to-date components available at the time of initial deployment. As further illustrated in FIG. 5, the management agent 159 can continuously update the application image 129 installed on and hosted by the virtual machine 143 after initial deployment.

Moreover, the use of a virtual machine 143 as a virtual appliance instantiated and managed in the manner previously described allows for the use of a single code-base, as exemplified by the application source code 136, for developing an application image 129 for a hosted application. This result stems from two properties of the previously illustrated deployment and configuration process. First, the inclusion of the container orchestration service 153 in the virtual machine 143 allows for an application image 129 developed for deployment on a container orchestration service 153 in a cloud-based or similar hosted computing environment to be deployed on the virtual machine 143 residing in a customer's own data center or server. Alternatively, the virtual machine 143 could be deployed in any environment (e.g., cloud-based or customer operated), allowing for a single target deployment environment for the application.

Although the administrative console 113, the assembler 116, the update service 119, the notifier service 123, the configuration service 149, the container orchestration service 153, and the management agent 159 can be implemented in software or code executed by general purpose hardware as discussed above, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included within the scope of this disclosure.

Therefore, we claim:

1. A system to create managed virtual appliances, comprising:
    a computing device comprising a processor and a memory;
    an assembler stored in the memory that, when executed by the processor, causes the computing device to at least create a virtual machine image by at least inserting a manifest file into the virtual machine image, the manifest file specifying configuration settings used by a management agent installed on the virtual machine image to configure an application image in response to installation of the application image to the virtual machine image; and
    the virtual machine image comprising:
        an operating system;
        a container orchestration service configured to host an instance of an application image; and
        a configuration service configured to at least:
            install a management agent in response to a first boot of the virtual machine image;
            configure the management agent to download and install the application image; and
            cause the management agent to execute, wherein the execution of the management agent at least downloads and installs the application image and, in response to installation of the application image, downloads and installs individual parts of the application image that have been updated.

2. The system of claim 1, wherein the management agent is further configured to at least:
    determine that an update for the application image is available from an update service.

3. The system of claim 2, wherein the management agent is further configured to send a notification to a previously specified user in response to the determination that the update for the application image is available from the update service.

4. The system of claim 2, wherein the management agent is further configured to:
determine that the update is approved for installation in response to a determination that the update for the application image is available from the update service, wherein retrieval of the update occurs in response to a determination that the update is approved for installation.

5. The system of claim 1, wherein the assembler causes the computing device to create the virtual machine image in response to receipt of a command to create the virtual machine image.

6. The system of claim 1, wherein the assembler further causes the computing device to create a uniform resource locator (URL) from which the virtual machine image can be retrieved.

7. The system of claim 1, wherein the application image comprises a plurality of containers managed by the container orchestration service.

8. A method for creating managed virtual appliances, comprising:
receiving a command to create a virtual machine image for a hosted instance of an application image; and
creating the virtual machine image in response to receiving the command by at least inserting a manifest file into the virtual machine image, the manifest file specifying configuration settings used by a management agent installed in the virtual machine image to configure the application image in response to installation of the application image on the virtual machine and the virtual machine image comprising:
an operating system;
a container orchestration service configured to host the instance of the application image; and
a configuration service configured to at least:
install a management agent in response to a first boot of the virtual machine image;
configure the management agent to download and install the application image; and
cause the management agent to execute, wherein the execution of the management agent at least downloads and installs the application image and, in response to installation of the application image, downloads and installs individual parts of the application image that have been updated.

9. The method of claim 8, wherein the management agent is further configured to at least:
determine that an update for the application image is available from an update service.

10. The method of claim 9, wherein the management agent is further configured to send a notification to a previously specified user in response to the determination that the update for the application image is available from the update service.

11. The method of claim 9, wherein the management agent is further configured to:
determine that the update is approved for installation in response to a determination that the update for the application image is available from the update service; and
retrieval of the update occurs in response to a determination that the update is approved for installation.

12. The method of claim 8, further comprising creating a uniform resource locator (URL) from which the virtual machine image can be retrieved.

13. The method of claim 8, wherein the application image comprises a plurality of containers managed by the container orchestration service.

14. A non-transitory computer-readable medium for creating managed virtual appliances, the non-transitory computer-readable medium comprising machine-readable instructions that, when executed by a processor of a computing device, cause the computing device to at least:
receive a command to create a virtual machine image for a hosted instance of an application image; and
create a virtual machine image in response to receipt of the request for the hosted instance of the application image by at least inserting a manifest file into the virtual machine image, the manifest file specifying configuration settings used by a management agent installed in the virtual machine image to configure the application image in response to installation of the application image on the virtual machine image and the virtual machine image comprising:
an operating system;
a container orchestration service configured to host the instance of the application image; and
a configuration service configured to at least:
install a management agent in response to a first boot of the virtual machine image;
configure the management agent to download and install the application image; and
cause the management agent to execute, wherein the execution of the management agent at least downloads and installs the application image and, in response to installation of the application image, downloads and installs individual parts of the application image that have been updated.

15. The non-transitory computer-readable medium of claim 14, wherein the management agent is further configured to at least:
determine that an update for the application image is available from an update service.

16. The non-transitory computer-readable medium of claim 15, wherein the management agent is further configured to send a notification to a previously specified user in response to the determination that the update for the application image is available from the update service.

17. The non-transitory computer-readable medium of claim 15, wherein the management agent is further configured to:
determine that the update is approved for installation in response to a determination that the update for the application image is available from the update service; and
retrieval of the update occurs in response to a determination that the update is approved for installation.

18. The non-transitory computer-readable medium of claim 15, wherein the machine-readable instructions further cause the computing device to create a uniform resource locator (URL) from which the virtual machine image can be retrieved.

19. The non-transitory computer-readable medium of claim 14, wherein the application image comprises a plurality of containers managed by the container orchestration service.

20. The non-transitory computer-readable medium of claim 19, wherein the plurality of containers provide operating-system-level virtualization environments that can be used to host separate applications or services.

* * * * *